(12) United States Patent
Bhattad et al.

(10) Patent No.: US 9,180,552 B2
(45) Date of Patent: Nov. 10, 2015

(54) SYSTEM AND METHOD FOR IDENTIFYING DEFECTS IN WELDS BY PROCESSING X-RAY IMAGES

(71) Applicant: ThinkSmart IT Solutions Private Limited, Pune (IN)

(72) Inventors: Nilesh Madanlal Bhattad, Pune (IN); Sagar Shankar Patil, Pune (IN)

(73) Assignee: THINKSMART IT SOLUTIONS PRIVATE LIMITED, Maharashtra (IN)

( * ) Notice: Subject to any disclaimer, the term of this patent is extended or adjusted under 35 U.S.C. 154(b) by 0 days.

(21) Appl. No.: 14/246,764

(22) Filed: Apr. 7, 2014

(65) Prior Publication Data
US 2014/0348415 A1  Nov. 27, 2014

(30) Foreign Application Priority Data
May 27, 2013 (IN) .......... 1872/MUM/2013

(51) Int. Cl.
G06K 9/00 (2006.01)
B23K 31/12 (2006.01)
G06T 7/00 (2006.01)

(52) U.S. Cl.
CPC ............ *B23K 31/125* (2013.01); *G06T 7/0004* (2013.01); *G06T 2207/10116* (2013.01); *G06T 2207/30164* (2013.01)

(58) Field of Classification Search
CPC .............................. B23K 1/125; G06T 7/0004
USPC ................................................ 382/152, 150
See application file for complete search history.

(56) References Cited

U.S. PATENT DOCUMENTS

| | | | | |
|---|---|---|---|---|
| 5,182,775 | A | * | 1/1993 | Matsui et al. .................. 382/152 |
| 2009/0080764 | A1 | * | 3/2009 | Srinivasan et al. ............ 382/150 |

OTHER PUBLICATIONS

Mahmoudi et al: "A Fast Segmentation Method for Defects Detection in Radiographic Images of Welds", IEEE, 2009.*
Xin Wang et al., "Image Enhancement for Radiographic Non-Destructive Inspection of the Aircraft," 12th A-PCNDT 2006—Asia-Pacific Conference, Nov. 2006, Auckland, New Zealand.
V. Vaithiyanathan et al., "Weld Defect Detection in Radiography Based on Projection Profile and RST Invariant by Using LVQ", Journal of Theoretical and Applied Information Technology, vol. 34, No. 2, Dec. 31, 2011, pp. 167-172.

* cited by examiner

*Primary Examiner* — Ruiping Li
(74) *Attorney, Agent, or Firm* — Ditthavong & Steiner, P.C.

(57) ABSTRACT

Disclosed is a system and method for identifying a defect in a weld joint through an X-Ray image. An image capturing module captures the X-Ray image of the weld joint. The X-Ray image comprises dark areas and bright areas. An image processing module executes a gamma correction algorithm on the X-Ray image by using a standard power law transform in order to enhance contrast of the dark areas and the bright areas. The image processing module further passes the X-Ray image through one or more de-noising filters in order to remove noise from the X-Ray image. An analysis module identifies a fragment of the X-Ray image that comprises one or more dark area with respect to neighboring areas adjacent to the one or more dark area. The analysis module further segments the X-Ray image into one or more segments in order to identify the defect in the weld joint.

20 Claims, 5 Drawing Sheets

SYSTEM AND METHOD FOR IDENTIFYING DEFECTS IN WELDS BY PROCESSING X-RAY IMAGES

PRIORITY INFORMATION

This patent application takes priority from IN 1872/MUM/2013, which is incorporated herein in its entirety.

TECHNICAL FIELD

The present subject matter described herein, in general, relates to image processing, and more particularly to system and method for identifying defect in a weld joint based on image processing analysis.

BACKGROUND

Aerospace, automotive and other industries have been utilizing several welding processes known in the art in order to join various parts, segments, assemblies and fuselage segments. The welding processes enable joining of two metals or materials by forming a joint between them. However, the welding processes may not always result in creating a strong weld at the interface of the two materials resulting in a defective weld. The defective weld may be due to formation of void or cavity at the junction of the weld joint. Considering the critical applications such as aerospace and defense, it is of utmost importance to ensure that the weld joints are of high weld strength, and there are no defects in the weld joints due to formation of void, cavity or distortions at the interface of the materials being welded. Therefore, the materials welded using the welding processes needs to be checked to verify whether or not the weld formed is defective.

Conventionally, an X-Ray image of the weld joint is obtained and provided to a person, who manually inspects the X-Ray image to locate and identify the defects in the weld joint. Specifically, the person has to visually scan the X-Ray image to identify any defect in form of void, cavity, crack or distortions with the help of naked eye. However, this method of manual inspection is onerous and cumbersome. Further, identifying defective welds in a plurality of X-Ray images is challenging and time consuming process. Also, there is always possibility of human errors while identifying the defects in the X-Ray images. Hence, there was a need to automate the process of identifying the defects in the weld joints, which would potentially lead to a reduction in expenses and errors.

SUMMARY

Before the present system and method are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application. This summary is provided to introduce aspects related to systems and methods for identifying a defect in a weld joint and the aspects are further elaborated below in the detailed description. This summary is not intended to identify essential features of the proposed subject matter nor is it intended for use in determining or limiting the scope of the proposed subject matter.

In one implementation, a system for identifying a defect in a weld joint is disclosed. In one aspect, the system may comprise a processor and a memory coupled to the processor for executing a plurality of modules present in the memory. The plurality of modules may comprise an image capturing module, an image processing module, and an analysis module. The image capturing module may be configured to capture the X-Ray image of the weld joint. It may be understood that, the X-Ray image may comprise dark areas and bright areas. The dark areas and the bright areas having gray scale information that indicates luminance intensity. The image processing module may be configured to execute a gamma correction algorithm on the X-Ray image by using a standard power law transform in order to enhance contrast of the dark areas and the bright areas. The gamma correction algorithm may facilitate to differentiate between the dark areas and bright areas. In one aspect, the gamma correction algorithm may be executed on the gray scale information associated to each pixel in the X-Ray image [pmin, pmax]. The pmin indicates the gray scale information of the darkest pixel in the X-Ray image and the pmax indicates the gray scale information of the brightest pixel in the X-Ray image. The image processing module may further be configured to pass the X-Ray image through one or more de-noising filters in order to remove noise from the X-Ray image. The analysis module may be configured to identify a fragment of the X-Ray image comprising one or more dark area with respect to neighboring areas adjacent to the one or more dark area. In one aspect, the dark area may be identified by using a gradient discontinuity algorithm. It may be understood that, the dark area indicates presence of the defect in the weld joint. The analysis module may be configured to segment the X-Ray image into one or more segments based on the identification of the one or more dark area in the X-Ray image. The segmenting may facilitate in the identification of the defect in the weld joint. In one embodiment, the system may further comprise a classification module and a report generation module. The classification module may be configured to classify the weld joint in at least one category of a defective category and a non-defective category. The report generation module may be configured to generate a report depicting insightful information about the defect identified in the weld joint. In one aspect, the report may be generated upon classifying the X-Ray image of the weld joint in the defective category.

In another implementation, a method for identifying a defect in a weld joint is disclosed. The method comprises a plurality of steps performed by a processor. In one aspect, the X-Ray image of the weld joint may be captured. It may be understood that, the X-Ray image may comprise dark areas and bright areas. The dark areas and the bright areas having gray scale information that indicates luminance intensity. After capturing the X-Ray image, a gamma correction algorithm may be executed on the X-Ray image by using a standard power law transform in order to enhance contrast of the dark areas and the bright areas. The gamma correction algorithm may facilitate to differentiate between the dark areas and bright areas. In one aspect, the gamma correction algorithm may be executed on the gray scale information associated to each pixel in the X-Ray image [pmin, pmax]. The pmin indicates the gray scale information of the darkest pixel in the X-Ray image and the pmax indicates the gray scale information of the brightest pixel in the X-Ray image. Subsequent to the execution of the gamma correction algorithm, the X-Ray image may be passed through one or more de-noising filters in order to remove noise from the X-Ray image. After removing the noise, a fragment of the X-Ray image may be identified. In one aspect, the fragment may comprise one or more dark area with respect to neighboring areas adjacent to the one or more dark area. In one aspect, the dark area may be identified by using a gradient discontinuity algorithm. It may be understood that, the dark area indicates presence of the defect in the weld joint. Based on the identification of the one or more dark area, the X-Ray image may be segmented into one or more segments. In one aspect, the segmentation of the X-Ray image may facilitate in the identification of the defect in the weld joint.

In yet another implementation, a computer program product having embodied thereon a computer program for identifying a defect in a weld joint is disclosed. The computer program product comprises a program code for capturing the X-Ray image of the weld joint. It may be understood that, the X-Ray image may comprise dark areas and bright areas. The dark areas and the bright areas having gray scale information that indicates luminance intensity. The computer program product comprises a program code for executing a gamma correction algorithm on the X-Ray image by using a standard power law transform in order to enhance contrast of the dark areas and the bright areas. The gamma correction algorithm may facilitate to differentiate between the dark areas and bright areas. In one aspect, the gamma correction algorithm may be executed on the gray scale information associated to each pixel in the X-Ray image [pmin, pmax]. The pmin indicates the gray scale information of the darkest pixel in the X-Ray image and the pmax indicates the gray scale information of the brightest pixel in the X-Ray image. The computer program product comprises a program code for passing the X-Ray image through one or more de-noising filters in order to remove noise from the X-Ray image. The computer program product comprises a program code for identifying, after the removing the noise from the X-Ray image, a fragment of the X-Ray image that comprises one or more dark area with respect to neighboring areas adjacent to the one or more dark area. In one aspect, the dark area may be identified by using a gradient discontinuity algorithm. It may be understood that, the dark area indicates presence of the defect in the weld joint. The computer program product comprises a program code for segmenting the X-Ray image into one or more segments based on the identification of the one or more dark area in the X-Ray image. In one aspect, the segmentation of the X-Ray image may facilitate in the identification of the defect in the weld joint.

BRIEF DESCRIPTION OF THE DRAWINGS

The foregoing summary, as well as the following detailed description of embodiments, is better understood when read in conjunction with the appended drawings. For the purpose of illustrating the disclosure, there is shown in the present document example constructions of the disclosure, however, the disclosure is not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer like features and components.

Figure 1:
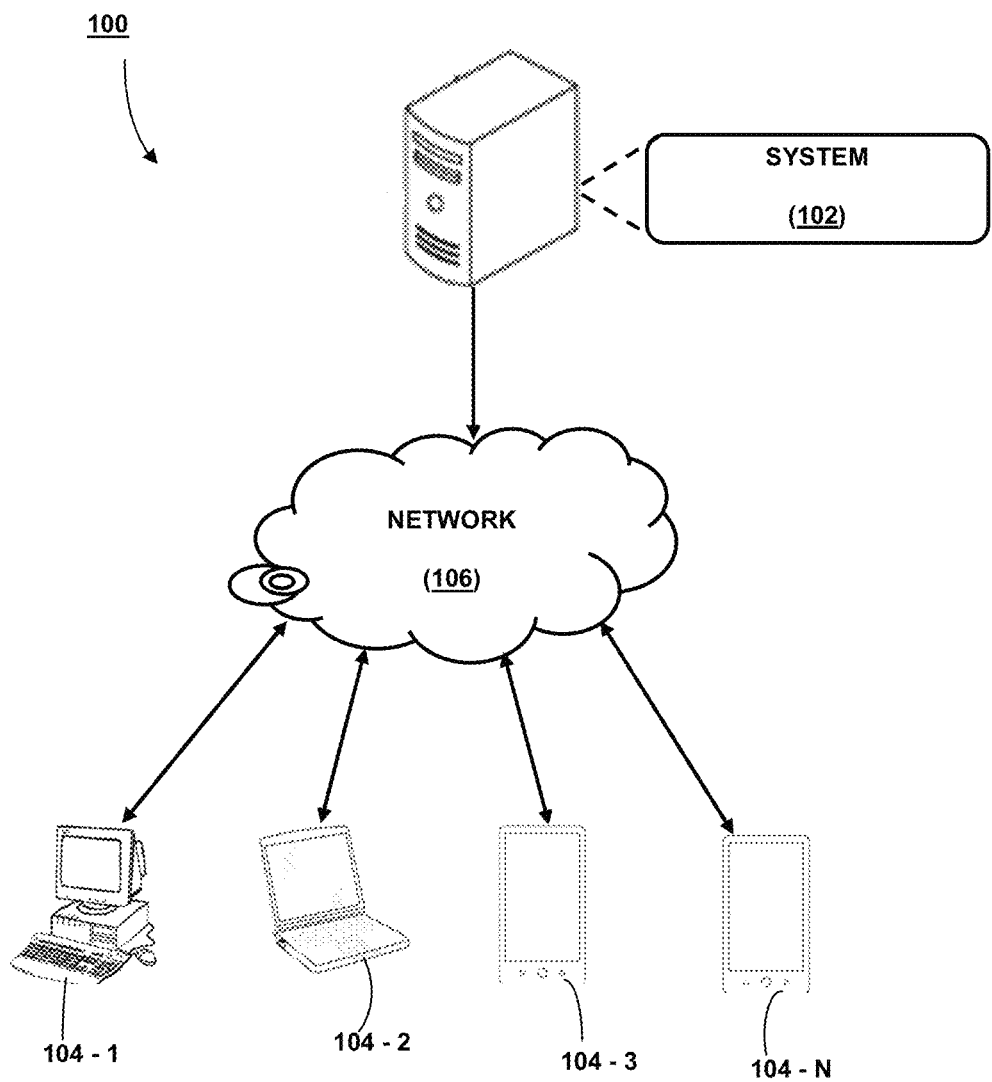
FIG. 1 illustrates a network implementation of a system for identifying a defect in a weld joint through an X-Ray image, in accordance with an embodiment of the present subject matter.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

System(s) and method(s) for identifying a defect in a weld joint using an image processing analysis are described. In one embodiment, an image of the weld joint may be captured. In one example, the image may be an X-Ray image. The weld joint may be formed by welding of machine parts, assemblies, and fuselage segments using at least one conventional welding process. After capturing the X-Ray image, the X-Ray image may then be subjected to image processing analysis. The image processing analysis may comprise executing a gamma correction algorithm on the X-Ray image in order to enhance contrast of dark areas and bright areas in the X-ray image. Subsequent to the executing of the gamma correction algorithm, the X-Ray image may be de-noised using a de-noising algorithm. Examples of the de-noising algorithm may include, but not limited to, a region-based segmentation and a thresholding technique. It may be understood that, the image processing analysis may further enable de-noising of the X-Ray image by using de-noising filters. Examples of the de-noising algorithm may include, but not limited to, a mean based de-noising, a weighted mean based de-noising and an adaptive median based de-noising.

Subsequent to the image processing analysis, the X-ray image may be analyzed in order to identify a fragment of the X-Ray image. The fragment may comprise one or more dark area with respect to neighboring areas adjacent to the one or more dark area. The dark area may be identified by using a gradient discontinuity algorithm. It may be understood that, the dark area may indicate presence of the defect in the weld joint. It may be understood that, the defect in the weld joint may be identified using segmentation technique. The segmentation technique may enable in identification of regions in the X-Ray image that may define the defect in form of a void, a crack, a cavity and a distortion. It may be understood that, the X-Ray image may be segmented based on the identification of the one or more dark area in the X-Ray image. In one aspect, the X-Ray image of the weld joint may be classified into at least one of least one of the categories of 'defective' and 'non-defective'. Subsequent to the classification of the X-Ray image in the 'defective' category, a report depicting insightful information about the defect identified in the weld joint may be generated. The insightful information may comprise observed values, expected values and comparison between the observed values and the expected values, wherein the values indicates dimensions of the defect identified at the weld joint.

While aspects of described system and method for identifying defects in weld joints may be implemented in any number of different computing systems, environments, and/or configurations, the embodiments are described in the context of the following exemplary system. Thus, the following more detailed description of the embodiments of the disclosure, as represented in the figures, is not intended to limit the scope of the disclosure, but is merely representative of certain examples of presently contemplated embodiments in accordance with the disclosure.

The presently described embodiments will be best understood by reference to the drawings, wherein like parts are designated by like numerals throughout. Moreover, the Figures illustrate the architecture, functionality, and operation of possible implementations of systems and methods according to various embodiments of the present disclosure.

Referring now to FIG. 1, a network implementation 100 of a system 102 for identifying a defect in a weld joint through an X-Ray image is illustrated, in accordance with an embodiment of the present subject matter. In one embodiment, the system 102 may capture the X-Ray image of the weld joint in which the defect is to be identified. After capturing the X-Ray image, the system 102 may execute a gamma correction algorithm on the X-Ray image in order to enhance contrast of the dark areas and the bright areas. Subsequent to the execution of the gamma correction algorithm, the system 102 may pass the X-Ray image through one or more de-noising filters in order to remove noise from the X-Ray image. After removing the noise from the X-Ray image, the system 102 may identify a fragment of the X-Ray image comprising one or more dark area with respect to neighboring areas adjacent to the one or more dark area. Based on the one or more dark area, the system 102 may segment the X-Ray image into one or more segments based on the identification of the one or more dark area in the X-Ray image. The segmenting may facilitate in the identification of the defect in the weld joint.

Although the present subject matter is explained considering that the system 102 is implemented as an image processing device, it may be understood that the system 102 may also be implemented in a variety of computing systems, such as a laptop computer, a desktop computer, a notebook, a workstation, a mainframe computer, a server, a network server and the like. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like. In one embodiment, the system 102 may be implemented as a stand-alone device without being connected to the user devices 104 through the network 106.

Figure 2:
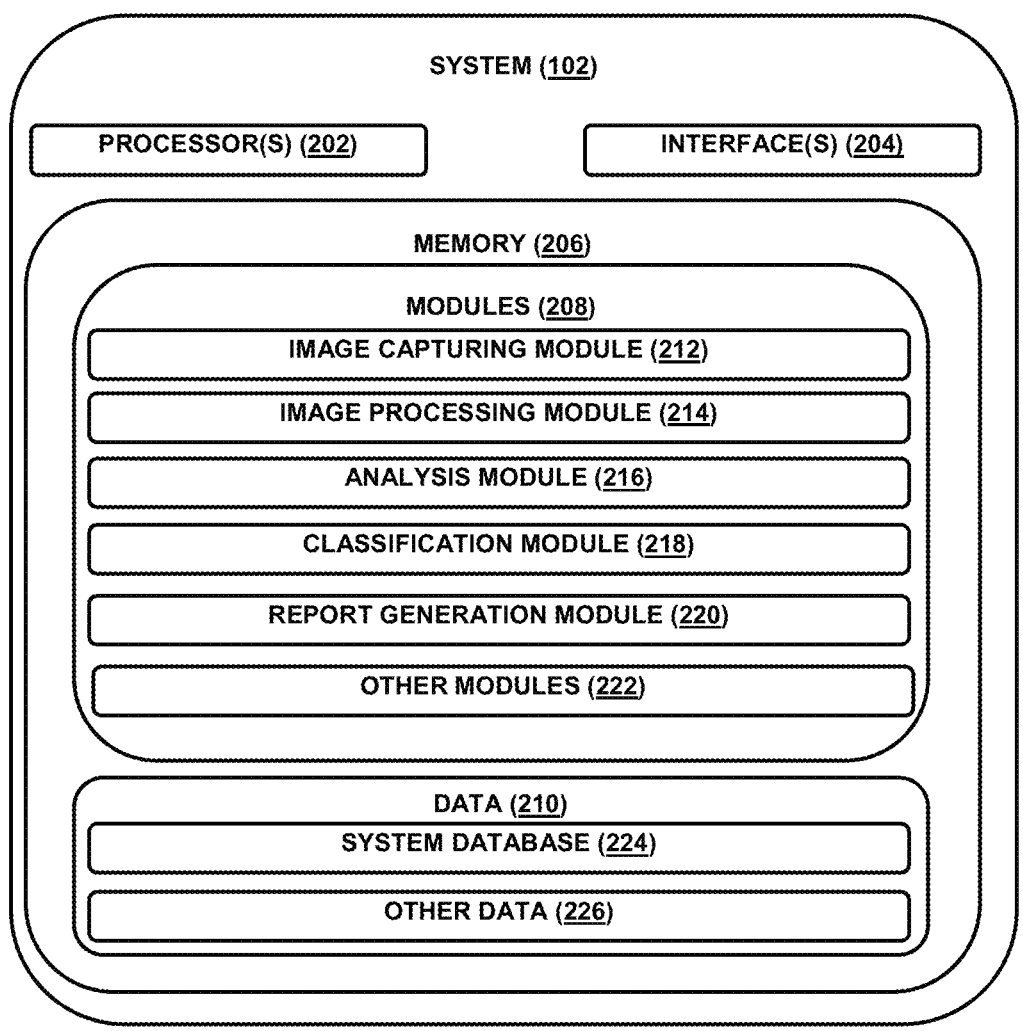
FIG. 2 illustrates the system for identifying the defect in the weld joint, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include an image capturing module 212, an image processing module 214, an analysis module 216, a classification module 218, a report generation module 220 and other modules 222. The other modules 222 may include programs or coded instructions that supplement applications and functions of the system 102.

The data 210, amongst other things, serves as a repository for storing data processed, received, and generated by one or more of the modules 208. The data 210 may also include a system database 224 and other data 226. The other data 226 may include data generated as a result of the execution of the programs or the coded instructions that supplement applications and functions of the system 102.

In one implementation, at first, a user may use one of the user devices 104 to access the system 102 via the I/O interface 204. The user may register themselves using the I/O interface 204 in order to use the system 102. In one aspect, the user may access the I/O interface 204 of the system 102 for identifying a defect in a weld joint using an image processing analysis. In order to in order to identify the defect, the system 102 may employ the image capturing module 212, the image processing module 214, the analysis module 216, the classification module 218, and the report generation module 220. The detailed working of the plurality of modules is described below.

Further referring to FIG. 2, at first, the image capturing module 212 may capture the image of a weld joint. In one example, the image may be an X-Ray image of the weld joint that may be formed by welding of machine parts, assemblies, and fuselage segments by using conventional welding process. In one aspect, the X-Ray image may comprise dark areas and bright areas. It may be understood that, the dark areas and the bright areas may have gray scale information that indicates luminance intensity of the dark areas and the bright areas in the X-Ray image. After capturing the X-Ray image, the X-Ray image may then be subjected to image processing analysis.

In order to perform the image processing, the image processing module 214 may execute a gamma correction algorithm on the X-Ray image. In one aspect, the gamma correction algorithm may be executed by using a standard power law transform. The standard power law transform enable to enhance contrast of the dark areas and the bright areas present in the X-Ray image. Based on the enhancement of the contrast, the gamma correction algorithm may facilitate to differentiate between the dark areas and bright areas.

In order to differentiate between the dark areas and bright areas, the gamma correction algorithm may be executed on the gray scale information associated to each pixel present in the X-Ray image [pmin, pmax]. In one aspect, pmin indicates (gray scale information)min of the darkest pixel in the X-Ray image and pmax indicates (gray scale information)max of the brightest pixel in the X-Ray image. In one embodiment, the image processing module 214 may execute the gamma correction algorithm in order to compute gamma correction values. The gamma correction values may be computed by using a mathematical formulation i.e. log(255)/log(pmax−pmin) in order to transform the gray scale information of each pixel of the X-Ray image by using the standard power law. The transformation of the gray scale information of each pixel enables to enhance the contrast of the dark areas and the bright areas and thereby facilitate to differentiate between the dark areas and bright areas in the X-Ray image.

Subsequent to the enhancing the contrast of the dark areas and the bright areas, the image processing module 214 may further pass the X-Ray image through one or more de-noising filters in order to remove noise from the X-Ray image. In other words, the X-Ray image may contain grainy or noisy objects (i.e. random dark pixels appearing in the bright areas or vice versa). Thus, in order to reduce false positives and to make the X-Ray image less grainy and noisy, the X-Ray may be passed through the one or more de-noising filters. Examples of the one or more de-noising filters may include, but not limited to, a mean based de-noising, a weighted mean based de-noising and an adaptive median based de-noising.

In one example, the mean based de-noising filter may use a square of size 3, such that $P1(x,y)=SUM(P'(i,j))/9$, where $i=x-1$ to $x+1$ and $j=y-1$ to $y+1$.

In one example, the weighted mean based de-noising may use a square of size 5, such that $P2(x,y)=SUM(P1(i,j)*w(m,n))$, where $m=-2$ to $2$, $n=-2$ to $2$, $i=x+m$, and $j=y+n$ and 'w' is the weight matrix that is based on the Euclidean distance from (0, 0). This is computed as follows:

For $m=-2$ to $2$, $n=-2$ to $2$, $w0(m,n)=\sqrt{(m*m+n*n)}$

For $m=-2$ to $2$, $n=-2$ to $2$, $w1(m,n)=MAX(w0)-w0(m,n)$

For $m=-2$ to $2$, $n=-2$ to $2$, $w(m,n)=w1(m,n)/SUM(w1)$

In one example, the adaptive median based de-noising may use a square of size 7, such that $m(x,y)=Median(P2(i,j))$, where $i=x-3$ to $x+3$, $j=y-3$ to $y+3$ Compute $P3(x,y)$, if $m(x,y)$ is not $(MIN(P2(i,j))$ or $MAX(P2(i,j)))$, then $P3(x,y)=m(x,y)$, else, $P3(x,y)=P2(x,y)$ After removing the noise from the X-Ray image, the analysis module 216 may identify a fragment of the X-Ray image that comprises one or more dark area with respect to neighboring areas adjacent to the one or more dark area. In one aspect, the fragment may be identified by using a gradient discontinuity algorithm. It may be understood that, the dark area indicates presence of the defect in the weld joint. In one aspect, the identification of the fragment comprising the one or more dark area may be performed by comparing the gray scale information of the one or more dark area with respect to the neighboring areas adjacent to the one or more dark area by using the gradient discontinuity algorithm. In order to identify the fragment comprising the one or more dark area, the gradient discontinuity algorithm may executed in the following manner:

I) Defining defects: considering p(x, y) denote the grayscale color of the pixel at coordinates (x, y) in the X-Ray image. Considering $Mx+(x, y, n)$ be the arithmetic mean of 'n' pixels, after pixel (x, y), along the x-axis.

For $(i=1 \ldots n)$, the $M_{x+}(x,y,n)=(\Sigma p(x+i,y))/n$

Figure 3A:
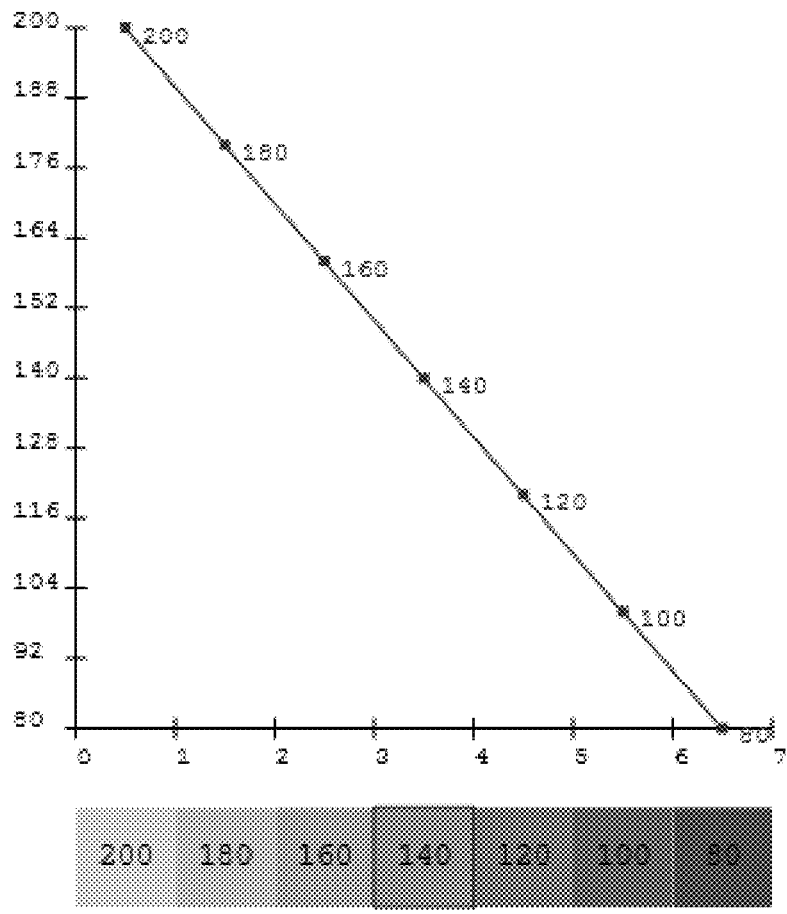
FIGS. 3(a) and 3(b) illustrate a statistical analysis applied on the image to identify the defect area/region in the image, in accordance with an embodiment of the present subject matter.

Similarly, for $(i=1 \ldots n)$, $M_{x-}(x,y,n)=(\Sigma p(x-i,y))/n$ $M_{y+}(x,y,n)=(\Sigma p(x,y+i))/n$ $M_{y-}(x,y,n)=(\Sigma p(x,y-i))/n$ II) Uniform Linear Gradient: Considering a pixel lying on a uniform linear gradient, as shown in FIG. 3(a). It may be understood that, in ideal horizontal linear gradient (y=0), p(x, y)−p(x−1, y)=p(x+1, y)−p(x, y). For example 140−160=−20, 120−140=−20; and 100−120=−20

Similarly, for 'n' pixels, p(x, y)−Mx−(x, y, n)=Mx+(x, y, n)−p(x, y). In one example, when n=3, 140−(200+180+160)/3=140−180=−40 and (120+100+80)/3−140=100−140=−40

Rearranging the equation, considering h(x, y)=p(x, y)−Mx−(x, y, n)+p(x, y)−Mx+(x, y, n), then, h(x, y)=0. Similarly, for an ideal vertical linear gradient (x=0), considering v(x, y)=p(x, y)−My−(x, y, n)+p(x, y)−My+(x, y, n), then, v(x, y)=0

Figure 3B:
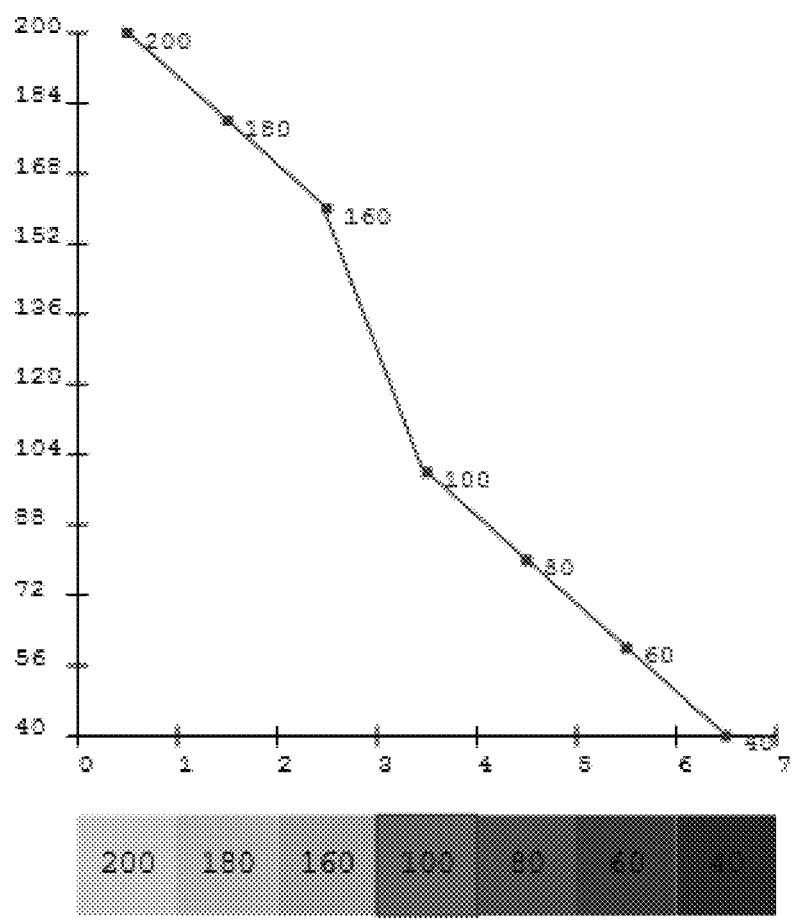

III) Gradient discontinuity: a discontinuity in the horizontal gradient is indicated by: $h(x, y) \neq 0$ Consider the horizontal line of pixels shown in FIG. 3(b). As illustrated, the pixel under consideration is at the edge of the dark area. For such pixels: h(x, y)=p(x, y)−Mx−(x, y, n)+p(x, y)−Mx+(x, y, n)<0. In one example, considering n=3, then 100−(200+180+160)/3=100−180=−80, 100−(80+60+40)/3=100−60=40, and −80+40=−40<0

IV) Identifying dark areas: convert the X-Ray image 'p' to an image 'q' such that: q(x, y)=(h(x, y)+v(x, y))/2. For all p(x, y) that lie on uniform local gradients, q(x, y)=0. For all p(x, y) that are in the one or more dark area with respect to neighboring areas adjacent to the one or more dark area, q(x, y)<0. Thus, in this manner, the gradient discontinuity algorithm may facilitate to identify the fragment comprising the one or more dark area with respect to neighboring areas adjacent to the one or more dark area in the X-Ray.

Based on the identification of the fragment comprising the one or more dark area, the analysis module 216 may segment the X-Ray image into one or more segments. In one aspect, the segmentation may be used to identify connected regions in q(x, y) that define the defect in the weld joint. Subsequent to the identification of the defect, the classification module 218 may classify the X-Ray image of the weld joint in at least one category of a defective category and a non-defective category. In one embodiment, upon classification of the X-Ray image in the defective category, the report generation module 220 may generate a report depicting insightful information about the defect identified in the weld joint. The insightful information may comprise observed values, expected values and comparison between the observed values and the expected values, wherein the values indicates dimensions of the defect identified at the weld joint.

Exemplary embodiments discussed above may provide certain advantages. Though not required to practice aspects of the disclosure, these advantages may include those provided by the following features.

Some embodiments enable a system and a method for automating the process of identifying defects in welded joints through X-Ray or radiographic images.

Some embodiments enable a system and a method for identifying the defects by using a gradient discontinuity algorithm thereby allowing identification of the defect without manual intervention.

Figure 4:
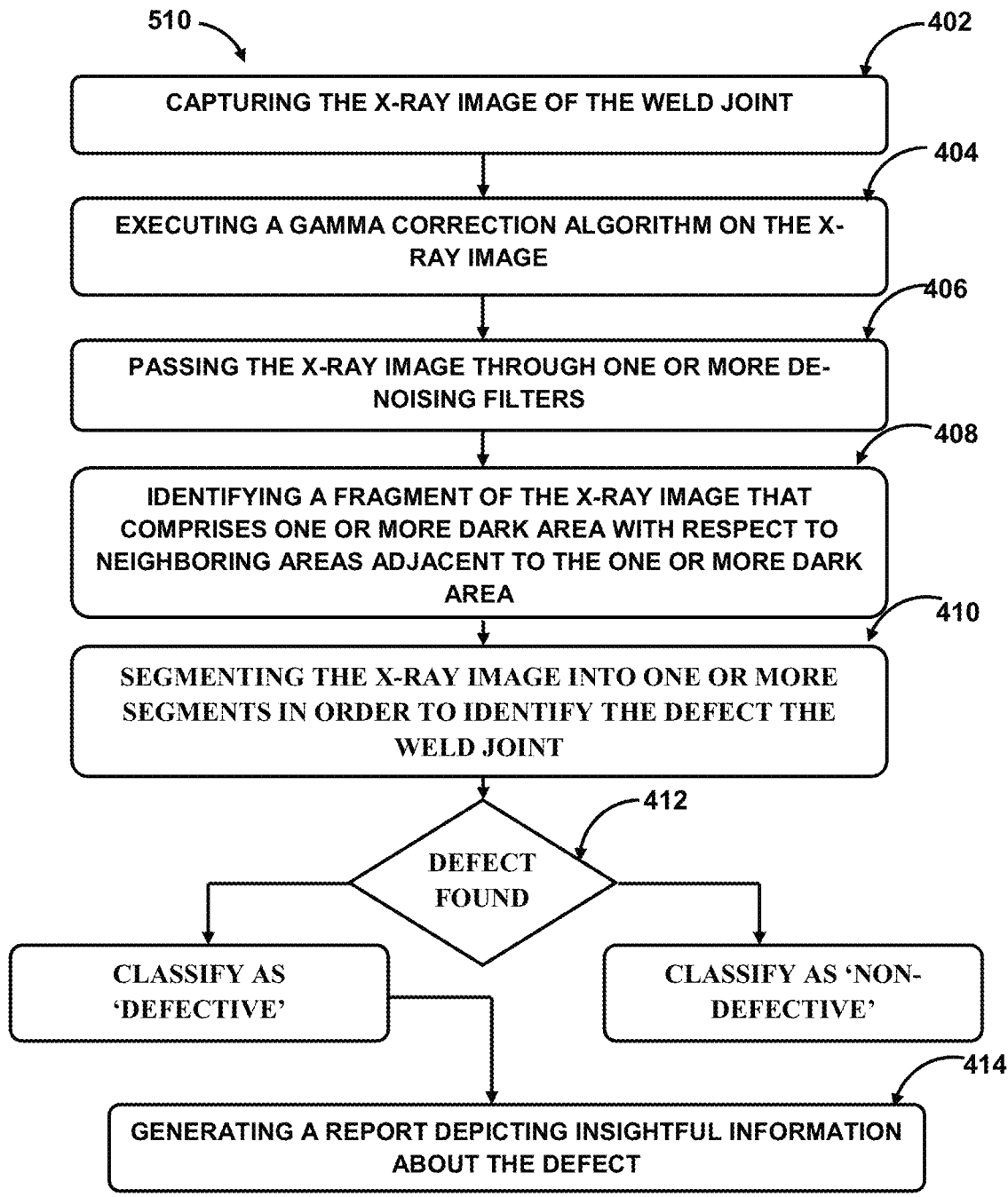
FIG. 4 illustrates the method for identifying the defect in the weld joint, in accordance with an embodiment of the present subject matter.

Referring now to FIG. 4, a method 400 for identifying a defect in a weld joint through an X-Ray image is illustrated in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 102.

At block 402, an X-Ray image of the weld joint in which the defect is to be indentified may be captured. In one implementation, the X-Ray image may be captured by the image capturing module 212. The X-Ray image may be stored in the system database 224.

At block 404, a gamma correction algorithm may be executed on the X-Ray image. In one aspect, the gamma correction algorithm may be executed by using a standard power law transform in order to enhance contrast of the dark areas and the bright areas. In one implementation, the gamma correction algorithm may be executed by the image processing module 214.

At block 406, the X-Ray image may be passed through one or more de-noising filters in order to remove noise from the X-Ray image. In one implementation, the gamma correction algorithm may be executed by the image processing module 214.

At block 408, a fragment of the X-Ray image comprising one or more dark area with respect to neighboring areas adjacent to the one or more dark area may be identified. In one implementation, the dark area indicates presence of the defect in the weld joint. In one implementation, the one or more dark area in the fragment of the X-Ray image may be identified by the analysis module 216.

At block 410, the X-Ray image may be segmented into one or more segments based on the identification of the one or more dark area in the X-Ray image. In one aspect, the one or more dark area in the segment facilitates in the identification of the defect in the weld joint. In one implementation, the X-Ray image may be segmented by the analysis module 216.

At block 412, the X-Ray image of the weld joint may be classified in at least one category of a defective category and a non-defective category. In one implementation, the X-Ray image may be classified by the classification module 218.

At block 414, a report depicting insightful information about the defect identified in the weld joint may be generated. In one aspect, the report may depict the insightful information upon classifying the X-Ray image in the defective category. In one implementation, the report may be generated by the report generation module 220.

Although implementations for methods and systems for identifying a defect in a weld joint have been described in language specific to structural features and/or methods, it is to be understood that the appended claims are not necessarily limited to the specific features or methods described. Rather, the specific features and methods are disclosed as examples of implementations for identifying the defect in the weld joint.

We claim:

1. A method comprising:
capturing an X-Ray image of a weld joint, wherein the X-Ray image comprises dark areas and bright areas, and wherein the dark areas and the bright areas have gray scale information that indicates a luminance intensity;

executing a gamma correction algorithm on the X-Ray image by using a standard power law transform to enhance a contrast of the dark areas and the bright areas, wherein the gamma correction algorithm facilitates a differentiation between the dark areas and bright areas, and wherein the gamma correction algorithm is executed on the gray scale information associated with each pixel in the X-Ray image [$p_{min}$, $p_{max}$], and wherein $p_{min}$ indicates the gray scale information of a darkest pixel in the X-Ray image, and wherein $p_{max}$ indicates the gray scale information of a brightest pixel in the X-Ray image;

passing, upon execution of the gamma correction algorithm, the X-Ray image through one or more de-noising filters in order to remove noise from the X-Ray image;

identifying, upon removing the noise, a fragment of the X-Ray image that comprises at least one of the dark area with respect to one or more neighboring areas, wherein the at least one of the dark areas is identified by using a gradient discontinuity algorithm, and wherein the at least one of the dark areas indicates a presence of a defect in the weld joint; and segmenting the X-Ray image into one or more segments based on the identification of the at least one of the dark areas in the X-Ray image, wherein the segmenting facilitates an identification of the defect in the weld joint, and wherein the capturing, the executing, the passing, the identifying, the segmenting, or a combination thereof are performed by a processor.

2. The method of claim 1, wherein the executing further comprises:
computing gamma correction values in the X-Ray image by using a mathematical formulation, wherein the mathematical formulation is $\log(255)/\log(p_{max}-p_{min})$; and
transforming the gray scale information of each pixel of the X-Ray image using the standard power law thereby enhancing the contrast of the dark areas and the bright areas in the X-Ray image.

3. The method of claim 1, wherein the X-Ray is segmented by using at least one of a region-based segmentation and a thresholding technique.

4. The method of claim 1, wherein the one or more de-noising filters comprises a mean based de-noising, a weighted mean based de-noising, and an adaptive median based de-noising.

5. The method of claim 1, wherein the identifying further comprises:
comparing the gray scale information of the at least one of the dark areas with respect to the one or more neighboring areas to identify the defect in the weld joint.

6. The method of claim 1 further comprising classifying the weld joint in at least one category of a defective category and a non-defective-category.

7. The method of claim 6, wherein the weld joint is classified based upon the identification of the at least one of the dark areas present in the one or more segments of the X-Ray image.

8. A system comprising:
a processor; and
a memory coupled to the processor, wherein the processor is capable of executing a plurality of modules stored in the memory, and wherein the plurality of modules comprises:
an image capturing module configured to capture an X-Ray image of a weld joint, wherein the X-Ray image comprises dark areas and bright areas, and wherein the dark areas and the bright areas have gray scale information that indicates a luminance intensity;
an image processing module configured to
execute a gamma correction algorithm on the X-Ray image by using a standard power law transform to enhance a contrast of the dark areas and the bright areas, wherein the gamma correction algorithm facilitates a differentiation between the dark areas and bright areas, wherein the gamma correction algorithm is executed on the gray scale information associated with each pixel in the X-Ray image $[p_{min}, p_{max}]$, wherein $p_{min}$ indicates the gray scale information of a darkest pixel in the X-Ray image, and wherein $p_{max}$ indicates the gray scale information of a brightest pixel in the X-Ray image; and
pass, upon execution of the gamma correction algorithm, the X-Ray image through one or more de-noising filters in order to remove noise from the X-Ray image; and
an analysis module configured to
identify, upon removing the noise, a fragment of the X-Ray image that comprises at least one of the dark areas with respect to one or more neighboring areas, wherein the at least one of the dark areas is identified by using a gradient discontinuity algorithm, and wherein the at least one of the dark areas indicates a presence of a defect in the weld joint; and
segment the X-Ray image into one or more segments based on the identification of the at least one of the dark areas in the X-Ray image, wherein the segmenting facilitates an identification of the defect in the weld joint.

9. The system of claim 8, further comprising a classification module configured to classify the X-Ray image of the weld joint in at least one category of a defective category and a non-defective-category.

10. The system of claim 9, wherein the weld joint is classified based upon the identification of the at least one of the dark areas present in the one or more segments of the X-Ray image.

11. The system of claim 8, further comprising a report generation module configured to generate a report depicting information about the defect identified in the weld joint, wherein the report is generated upon classifying the X-Ray image in the defective category.

12. The system of claim 8, wherein the image processing module is further configured to
compute gamma correction values in the X-Ray image by using a mathematical formulation, wherein the mathematical formulation is $\log(255)/\log(p_{max}-p_{min})$; and
transform the gray scale information of each pixel of the X-Ray image using the standard power law thereby enhancing the contrast of the dark areas and the bright areas in the X-Ray image.

13. The system of claim 8, wherein the X-Ray is segmented by using at least one of a region-based segmentation and a thresholding technique.

14. The system of claim 8, wherein the one or more de-noising filters comprises a mean based de-noising, a weighted mean based de-noising, and an adaptive median based de-noising.

15. The system of claim 8, wherein the analysis module is further configured to compare the gray scale information of the at least one of the dark areas with respect to the one or more neighboring areas to identify the defect in the weld joint.

16. A non transitory computer program product having embodied thereon a computer program carrying one or more instructions for:
capturing an X-Ray image of a weld joint, wherein the X-Ray image comprises dark areas and bright areas, and wherein the dark areas and the bright areas have gray scale information that indicates a luminance intensity;
executing a gamma correction algorithm on the X-Ray image by using a standard power law transform to enhance a contrast of the dark areas and the bright areas, wherein the gamma correction algorithm facilitates a differentiation between the dark areas and bright areas, wherein the gamma correction algorithm is executed on the gray scale information associated with each pixel in the X-Ray image $[p_{min}, p_{max}]$, wherein $p_{min}$ indicates the gray scale information of a darkest pixel in the X-Ray image, and wherein $p_{max}$ indicates the gray scale information of a brightest pixel in the X-Ray image;
passing, upon execution of the gamma correction algorithm, the X-Ray image through one or more de-noising filters in order to remove noise from the X-Ray image;
identifying, upon removing the noise, a fragment of the X-Ray image that comprises at least one of the dark area with respect to one or more neighboring areas, wherein the at least one of the dark areas is identified by using a gradient discontinuity algorithm, and wherein the at least one of the dark areas indicates a presence of a defect in the weld joint; and segmenting the X-Ray image into one or more segments based on the identification of the at least one of the dark areas in the X-Ray image, wherein the segmenting facilitates an identification of the defect in the weld joint.

17. The non-transitory computer program product of claim 16, wherein the X-Ray is segmented by using at least one of a region-based segmentation and a thresholding technique.

18. The non-transitory computer program product of claim 16, wherein the one or more de-noising filters comprises a mean based de-noising, a weighted mean based de-noising, and an adaptive median based de-noising.

19. The non-transitory computer program product of claim 16, wherein the computer program further carries instructions for:

comparing the gray scale information of the at least one of the dark areas with respect to the one or more neighboring areas to identify the defect in the weld joint.

20. The non-transitory computer program product of claim 16, wherein the computer program further carries instructions for:

classifying the weld joint in at least one category of a defective category and a non-defective category.

\* \* \* \* \*